US009317114B2

(12) United States Patent
Hwang

(10) Patent No.: US 9,317,114 B2
(45) Date of Patent: Apr. 19, 2016

(54) DISPLAY PROPERTY DETERMINATION

(71) Applicant: KOREA ADVANCED INSTITUTE OF SCIENCE AND TECHNOLOGY, Daejeon (KR)

(72) Inventor: Sung Jae Hwang, Daejeon (KR)

(73) Assignee: KOREA ADVANCED INSTITUTE OF SCIENCE AND TECHNOLOGY (KR)

( * ) Notice: Subject to any disclaimer, the term of this patent is extended or adjusted under 35 U.S.C. 154(b) by 27 days.

(21) Appl. No.: 14/073,056

(22) Filed: Nov. 6, 2013

(65) Prior Publication Data
US 2014/0333521 A1 Nov. 13, 2014

(30) Foreign Application Priority Data
May 7, 2013 (KR) .................. 10-2013-0051529

(51) Int. Cl.
G09G 5/00 (2006.01)
G06F 3/01 (2006.01)
G09G 3/00 (2006.01)
G02B 27/01 (2006.01)

(52) U.S. Cl.
CPC .............. *G06F 3/013* (2013.01); *G02B 27/017* (2013.01); *G09G 3/003* (2013.01); *G02B 2027/014* (2013.01); *G02B 2027/0112* (2013.01); *G02B 2027/0118* (2013.01); *G02B 2027/0147* (2013.01); *G02B 2027/0187* (2013.01)

(58) Field of Classification Search
None
See application file for complete search history.

(56) References Cited

U.S. PATENT DOCUMENTS

| 8,203,502 | B1 | 6/2012 | Chi et al. | |
| 2008/0136916 | A1* | 6/2008 | Wolff | 348/169 |
| 2008/0158686 | A1 | 7/2008 | Chechelniker | |
| 2010/0079356 | A1 | 4/2010 | Hoellwarth | |
| 2010/0220037 | A1 | 9/2010 | Sako et al. | |
| 2011/0228059 | A1* | 9/2011 | Nagai | 348/54 |

FOREIGN PATENT DOCUMENTS

| JP | 2008043359 | 2/2008 |
| KR | 100590659 | 6/2006 |

\* cited by examiner

*Primary Examiner* — Nicholas Lee
(74) *Attorney, Agent, or Firm* — Cantor Colburn LLP

(57) ABSTRACT

A display apparatus may include an optical element having thereon an information area; an eye tracker configured to detect an activity of at least one pupil within eyes; a processor configured to change a display property of the information area based at least in part on the activity of the at least one pupil.

17 Claims, 9 Drawing Sheets

DISPLAY PROPERTY DETERMINATION

CROSS-REFERENCE TO RELATED PATENT APPLICATION

This application claims priority from the Korean Patent Application No. 10-2013-0051529, filed on May 7, 2013 in the Korean Intellectual Property Office, the entire disclosure of which is incorporated herein by reference in its entirety.

FIELD

Example embodiments broadly relate to schemes for changing a display property of an information area on an optical element based on an activity of a pupil within an eye.

BACKGROUND

There are various mechanisms for allowing a viewer to view a display without having to look down. For example, heads-up displays (HUDs) or head-mounted displays (HMDs) have been developed to allow a viewer to see an image on a display without looking down at a monitor or a screen of a computer.

SUMMARY

According to an aspect of example embodiments, there is provided a display apparatus including an optical element having thereon an information area; an eye tracker configured to detect an activity of at least one pupil within eyes; a processor configured to change a display property of the information area based at least in part on the activity of the at least one pupil.

The display property may include at least one of a transparency, a size, a brightness, a chroma, a resolution or a blinking speed of the information area.

The processor may further determine a gaze point of the at least one pupil based at least in part on the detected activity of the at least one pupil, calculate a distance between the gaze point of the at least one pupil and the information area, and determine the display property of the information area based at least in part on the calculated distance.

The processor may further increase the transparency of the information area, as the distance increases, and the processor may further decrease the transparency of the information area, as the distance decreases.

The processor may further decrease at least one of the size, the brightness, the blinking speed, the resolution, or the chroma of the information area, as the distance increases.

The processor may further determine that the distance is larger than a predetermined value, and change the transparency of the information area.

The transparency of the information area may be changed in an S-shaped curve, as the distance increases or decreases.

The processor may further decrease the transparency of the information area at a faster speed than a case where the processor increases the transparency of the information area.

The processor may further determine whether a gaze point of the at least one pupil moves from an outside of the information area to an inside of the information area based at least in part on the detected activity of the at least one pupil, and decrease the transparency of the information area, if the gaze point is determined to move from the outside of the information area to the inside of the information area.

The processor may further determine a gaze point of the at least one pupil based at least in part on the detected activity of the at least one pupil, and change the display property of the information area, if the gaze point moves from an inside of the information area to an outside of the information area and then the gaze point exists outside of the information area for a predetermined time.

The processor may further calculate a focal length of the at least one pupil based at least in part on the detected activity of the at least one pupil, and determine the display property of the information area based at least in part on the calculated focal length.

The processor may further increase the transparency of the information area, as the focal length increases.

The processor may further determine that the focal length is larger than a predetermined value, and change the transparency of the information area.

The processor may further increase at least one of the size, the brightness, the resolution, or the chroma of the information area, as the focal length decreases.

The processor may further detect a moving pattern of a gaze point of the at least one pupil based at least in part on the detected activity of the at least one pupil, calculate a similarity between the moving pattern and a predetermined pattern stored in a memory, and determine the display property of the information area based at least in part on the calculated similarity.

The processor may further determine a gaze point of the at least one pupil based at least in part on the detected activity of the at least one pupil, and change the display property of the information area, if the gaze point exists inside of a predetermined area on the optical element for a predetermined time.

The eye tracker may further detect an activity of the eyes. The processor may further determine a number of a blink of the eyes during a predetermined time based at least in part on the detected activity of the eyes, determine that the number of the blink of the eyes is equal to or larger than a predetermined value, and change the display property of the information area.

The eye tracker may include at least one inside camera configured to capture an image of the at least one pupil within the eyes.

The display apparatus may further include an on/off switch configured to stop or start at least one operation of the eye tracker and/or the processor.

According to another aspect of example embodiments, a method performed under control of a display apparatus may include: detecting an activity of at least one pupil within eyes; and changing a display property of an information area that is displayed on an optical element of the display apparatus based at least in part on the activity of the at least one pupil.

BRIEF DESCRIPTION OF THE DRAWINGS

Non-limiting and non-exhaustive example embodiments will be described in conjunction with the accompanying drawings. Understanding that these drawings depict only example embodiments and are, therefore, not intended to limit its scope, the example embodiments will be described with specificity and detail taken in conjunction with the accompanying drawings, in which.

DETAILED DESCRIPTION

Figure 1:
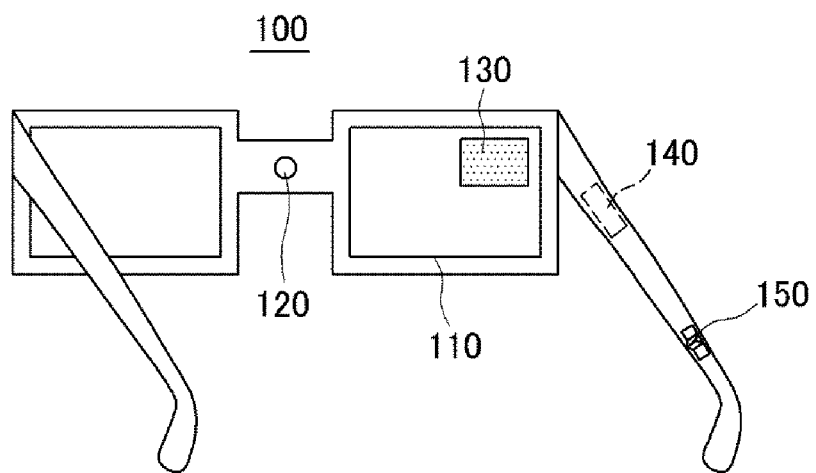
FIG. 1 schematically shows an illustrative example of a display apparatus in accordance with at least some embodiments described herein.

Hereinafter, some embodiments will be described in detail. It is to be understood that the following description is given only for the purpose of illustration and is not to be taken in a limiting sense. The scope of the invention is not intended to be limited by the embodiments described hereinafter with reference to the accompanying drawings, but is intended to be limited only by the appended claims and equivalents thereof.

It is also to be understood that in the following description of embodiments any direct connection or coupling between functional blocks, devices, components, circuit elements or other physical or functional units shown in the drawings or described herein could also be implemented by an indirect connection or coupling, i.e. a connection or coupling comprising one or more intervening elements. Furthermore, it should be appreciated that functional blocks or units shown in the drawings may be implemented as separate circuits in some embodiments, but may also be fully or partially implemented in a common circuit in other embodiments. In other words, the provision of functional blocks in the drawings is intended to give a clear understanding of the various functions performed, but is not to be construed as indicating that the corresponding functions are necessarily implemented in physically separate entities.

It is further to be understood that any connection which is described as being wire-based in the following specification may also be implemented as a wireless communication connection unless noted to the contrary.

The features of the various embodiments described herein may be combined with each other unless specifically noted otherwise. On the other hand, describing an embodiment with a plurality of features is not to be construed as indicating that all those features are necessary for practicing the present invention, as other embodiments may comprise less features and/or alternative features.

FIG. 1 schematically shows an illustrative example of a display apparatus in accordance with at least some embodiments described herein. As depicted in FIG. 1, a display apparatus 100 may be configured to include an optical element 110, an eye tracker 120, an information area 130, a processor 140 and an on/off switch 150. Although illustrated as discrete components, various components may be divided into additional components, combined into fewer components, or eliminated altogether while being contemplated within the scope of the disclosed subject matter. Non-limiting examples of display apparatus 100 may include a glasses, a head mount display device, a head up display device, a telescope, or other kinds of display devices.

Optical element 110 may be configured to be coupled with display apparatus 100, and a viewer may see something outside thereof such as a landscape, a monitor or a screen through optical element 110. By way of example, but not limitation, optical element 110 may include at least one of a lens of a glasses, a window of a car, an optical panel or a film of a head mount display device or a telescope. Further optical element 110 may include a glass panel, a transparent film, or a transparent sheet coupled to various display devices.

Eye tracker 120 may be configured to be coupled with or installed on display apparatus 100. Eye tracker 120 may include at least one inside camera which is configured to capture an image of at least one pupil within eyes. For example, eye tracker 120 may be positioned on an inner surface of a glasses bridge connecting a left lens with a right lens to face at least one pupil within eyes.

Eye tracker 120 may be configured to detect an activity of the at least one pupil within the eyes. By way of example, but not limitation, eye tracker 120 may be configured to include a light emitter, a light receiver and an analyzer. The light emitter may be configured to emit a light to the pupil, and the light receiver may be configured to receive the light reflected from the pupil, and the analyzer may be configured to analyze changes in reflection based on the reflected light. According to such an optical method, the activity of the at least one pupil within the eyes may be detected by eye tracker 120.

By way of another example, eye tracker 120 may be configured to include an image sensor such as a charge-coupled device (CCD) sensor or a complementary metal-oxide-semiconductor (CMOS) sensor. The image sensor may be configured to capture an image of the pupil, so that the activity of the pupil may be detected by analyzing the captured image.

Although display apparatus 100 in FIG. 1 are illustrated to have one eye tracker 120, the number of eye tracker 120 may be changed. By way of example, but not limitation, display apparatus 100 may have two eye trackers to respectively detect an activity of a right pupil within a right eye and an activity of a left pupil within a left eye.

Information area 130 may be mounted or formed on a certain area of optical element 110. By way of example, information area 130 may be formed on a certain area of a glass panel, a transparent film, a transparent sheet and so forth. Further, a projector (not illustrated) may be installed on a certain position of display apparatus 100 to shoot beams to information area 130 on optical element 110 to display something on information area 130. Further, the illustrated size, position or shape of information area 130 may be changed.

Further, information area 130 may be configured to display any type of information content. By way of example, but not limitation, display apparatus 100 may be configured to previously store content such as a movie, a television broadcasting program, a music video and so forth. Information area 130 may be configured to display at least some of the stored content. By way of another example, information area 130 may be configured to display some of additional information that is associated with at least one object appearing in an outside view which is captured by an outside image sensor (not illustrated) of display apparatus 100. In some embodiments, the outside image sensor which is coupled with or installed on display apparatus 100 may capture an image of the outside view. By way of example, but not limitation, the outside image sensor may include various image sensor lenses such as a wide-angle lens, a telephoto lens, a zoom lens, a fish-eye lens and a lens for infrared optics, and the outside image sensor may further include a filter installed on the image sensor lens.

In some other embodiments, display apparatus 100 may receive real-time broadcasting content such as IPTV content from outside of display apparatus 100 via a network. Information area 130 may be configured to display at least some of the received real-time broadcasting content. The network may be an interconnected structure of nodes, such as terminals and servers, and allows sharing of information among the nodes. By way of example, but not limitation, the network may include a wired network such as LAN (Local Area Network), WAN (Wide Area Network), VAN (Value Added Network) or the like, and all kinds of wireless network such as a mobile radio communication network, a satellite network, a Bluetooth, Wibro (Wireless Broadband Internet), Mobile WiMAX, HSDPA (High Speed Downlink Packet Access) or the like.

Processor 140 may be configured to change a display property of information area 130 based at least in part on the activity of the at least one pupil within the eyes, which is detected by eye tracker 120. Non-limiting examples of the display property may include at least one of a transparency, a size, a brightness, a chroma, a display resolution, an on/off switch, or a blinking speed of information area 130. In some embodiments, processor 140 may be configured to determine a gaze point of the pupil based on the detected activity of the pupil. By way of example, processor 140 may be configured to determine the gaze point of the pupil by using any well-known gaze point determining method using binocular disparity information of the pupil. Processor 140 may be further configured to calculate a distance between the determined gaze point of the pupil and information area 130 on optical element 110. By way of example, a reference point in information area 130 may be predefined by processor 140, and process 140 may be configured to calculate the distance between the determined gaze point and the predefined reference point. Then, processor 140 may be configured to determine the display property of information area 130 based at least in part on the calculated distance and to change the display property of information area 130. By way of example, processor 140 may be configured to increase the transparency of information area 130, as the distance increases, otherwise, processor 140 may be configured to decrease the transparency of information area 130, as the distance decreases. By way of another example, processor 140 may be configured to decrease at least one of the size, the brightness, the blinking speed, the resolution, or the chroma of information area 130, as the distance increases. Further, in some embodiments, processor 140 may be configured to change the display property of information area 130 in an S-shaped curve, as the distance increases or decreases.

In some other embodiments, processor 140 may be configured to determine that the distance between the determined gaze point of the pupil and information area 130 is larger than a predetermined value, which is stored in a memory. Further processor 140 may be configured to change the display property of information area 130, if the distance is determined to be larger than the predetermined value. By way of example, processor 140 may be configured to start to increase the transparency of information area 130, if the distance is determined to be larger than the predetermined value. Alternatively, processor 140 may be configured to start to decrease at least one of the resolution, the chroma, the size or the brightness of information area 130, if the distance is determined to be larger than the predetermined value. By way of another example, processor 140 may be configured to turn off information area 130, if the distance is determined to be larger than the predetermined value. Alternatively, processor 140 may be configured to turn on information area 130, if the distance is determined to be equal to or smaller than the predetermined value.

In some other embodiments, processor 140 may be configured to change the display property of information area 130 with a various kind of changing speed. By way of example, but not limitation, processor 140 may be configured to decrease the transparency of information area 130 at a faster speed than a case where processor 140 increases the transparency of information area 130.

In some other embodiments, processor 140 may be configured to determine whether a gaze point of at least one pupil moves from an outside of information area 130 to an inside of information area 130 based at least in part on the activity of the pupil, which is detected by eye tracker 120. Further, processor 140 may be configured to change the display property of information area 130, if the gaze point is determined to move from the outside of information area 130 to the inside of information area 130. By way of example, but not limitation, processor 140 may be configured to decrease the transparency of information area 130, so information area 130 becomes clear and vivid, if the gaze point is determined to move from the outside of information area 130 to the inside of information area 130. Alternatively, processor 140 may be configured to increase at least one of the resolution, the chroma, the size or the brightness of information area 130, if the gaze point is determined to move from the outside of information area 130 to the inside of information area 130. By way of another example, processor 140 may be configured to turn on information area 130, if the gaze point is determined to move from the outside of information area 130 to the inside of information area 130.

In some other embodiments, processor 140 may be configured to determine a gaze point of at least one pupil based on the detected activity of the pupil. Further, processor 140 may be configured to determine whether the gaze point moves from an inside of information area 130 to an outside of information area 130. Processor 140 may be configured to change the display property of information area 130, if the gaze point is determined to move from the inside of information area 130 to the outside of information area 130. By way of example, but not limitation, processor 140 may be configured to increase the transparency of information area 130, so information area 130 becomes transparent, if the gaze point is determined to move from the inside of information area 130 to the outside of information area 130. Alternatively, processor 140 may be configured to decrease at least one of the resolution, the chroma, the size or the brightness of information area 130, if the gaze point is determined to move from the inside of information area 130 to the outside of information area 130. By way of another example, processor 140 may be configured to turn off information area 130, if the gaze point is determined to move from the inside of information area 130 to the outside of information area 130.

Further, processor 140 may be configured to determine whether the gaze point moves from the inside of information area 130 to the outside of information area 130 and then the gaze point exists the outside of information area 130 for a predetermined time. Processor 140 may be further configured to change the display property of information area 130, if the gaze point moves from the inside of information area 130 to the outside of information area 130 and then the gaze point exists the outside of information area 130 for the predetermined time.

In some other embodiments, processor 140 may be configured to calculate a focal length of the at least one pupil based at least in part on the activity of the at least one pupil, which is detected by eye tracker 120. By way of example, but not limitation, processor 140 may be configured to calculate the focal length of the at least one pupil by using any well-known focal length calculating method using binocular disparity information of the pupil, a shape of a ciliary body or a state of an eyeball. Further, processor 140 may be configured to determine the display property of information area 130 based at least in part on the calculated focal length and to change the display property of information area 130. By way of example, but not limitation, processor 140 may be configured to increase the transparency of information area 130, as the focal length increases. Although a gaze point of the pupil is positioned within information area 130, processor 140 may be configured to increase the transparency of information area 130 so that information area 130 become transparent, if a focal point of the pupil is focused on a deeper position than information area 130, so the focal length of the pupil is increased. By way of another example, processor 140 may be configured to increase at least one of the size, the brightness, the blinking speed, the resolution, or the chroma of information area 130, as the focal length decreases. That is, processor 140 may be configured to increase the brightness or the resolution of information area 130, so that information area 130 become clear and vivid, if the focal point of the pupil is focused on information area 130, so the focal length of the pupil is decreased to correspond to information area 130.

In some other embodiments, processor 140 may be configured to determine that the focal length is larger than a predetermined value, which is stored in a memory. Further processor 140 may be configured to change the display property of information area 130, if the focal length is determined to be larger than the predetermined value. By way of example, but not limitation, processor 140 may be configured to start to increase the transparency of information area 130, if the focal length is determined to be larger than the predetermined value. Alternatively, processor 140 may be configured to start to decrease at least one of the resolution, the chroma, the size or the brightness of information area 130, if the focal length is determined to be larger than the predetermined value. By way of another example, processor 140 may be configured to turn off information area 130, if the focal length is determined to be larger than the predetermined value.

In some other embodiments, processor 140 may be configured to detect a moving pattern of a gaze point of at least one pupil based at least in part on the activity of the at least one pupil, which detected by eye tracker 120. Further, processor 140 may be configured to calculate a similarity between the detected moving pattern and a predetermined pattern stored in a memory. Processor 140 may be configured to then determine the display property of information area 130 based at least in part on the calculated similarity. By way of example, but not limitation, processor 140 may be configured to determine whether the calculated similarity is larger than a predetermined value. Processor 140 may be configured to change the display property of information area 130, if the calculated similarity is determined to be larger than the predetermined value. By way of example, processor 140 may be configured to start to increase at least one of the resolution, the chroma, the size or the brightness of information area 130, so information area 130 becomes clear and vivid, if the calculated similarity is determined to be larger than the predetermined value. Alternatively, processor 140 may be configured to start to decrease the transparency of information area 130, if the calculated similarity is determined to be larger than the predetermined value. By way of another example, processor 140 may be configured to turn on information area 130, if the calculated similarity is determined to be larger than the predetermined value.

In some other embodiments, processor 140 may be configured to determine a gaze point of at least one pupil based at least in part on the activity of the pupil detected by eye tracker 120. Further, processor 140 may be configured to determine whether the gaze point exists inside of a predetermined area on optical element 110 for a predetermined time, which is stored in a memory. Processor 140 may be configured to then change the display property of information area 130, if the gaze point is determined to exist inside of the predetermined area on optical element 110 for the predetermined time. By way of example, processor 140 may be configured to start to increase at least one of the resolution, the chroma, the size or the brightness of information area 130, so information area 130 becomes clear and vivid, if the gaze point is determined to exist inside of the predetermined area on optical element 110 for the predetermined time. Alternatively, processor 140 may be configured to start to decrease the transparency of information area 130, if the gaze point is determined to exist inside of the predetermined area on optical element 110 for the predetermined time. By way of another example, processor 140 may be configured to turn on information area 130, if the gaze point is determined to exist inside of the predetermined area on optical element 110 for the predetermined time.

In some other embodiments, eye tracker 120 may be configured to detect an activity of the eyes. By way of example, eye tracker 120 may be configured to detect whether a viewer of display apparatus 100 blinks. Processor 140 may be configured to determine a number of blinks of the eyes during a predetermined time, which is stored in a memory, based at least in part on the activity of the eyes, which is detected by eye tracker 120. Further, processor 140 may be configured to determine whether the determined number of the blinks is equal to or larger than a predetermined value, which is stored in a memory. Processor 140 may be configured to then change the display property of information area 130, if the determined number of the blink is equal to or larger than the predetermined value. By way of example, processor 140 may be configured to start to decrease the transparency of information area 130, so information area 130 becomes clear and vivid, if the number of the blink is determined to be equal to or larger than the predetermined value. Alternatively, processor 140 may be configured to start to increase at least one of the resolution, the chroma, the size or the brightness of information area 130, if the number of the blink is determined to be equal to or larger than the predetermined value. By way of another example, processor 140 may be configured to turn on or turn off information area 130, if the number of the blink is determined to be equal to or larger than the predetermined value.

On/off switch 150 may be configured to stop or start operations of display apparatus 100. By way of example, if a viewer of display apparatus 100 wants to use a function of display apparatus 100 such as displaying of content by information area 130, detecting of an activity of a pupil within an eye by eye tracker 120 and/or changing of a display property of information area 130 by processor 140, the viewer may turn on on/off switch 150, and then the operations of display apparatus 100 may be started. Further, the viewer wants to stop the operations of display apparatus 100, the viewer may turn off on/off switch 150, and then the operations of display apparatus 100 may be stopped. By way of example, but not limitation, on/off switch 150 may be a single button or two buttons including an "on" button and an "off" button. By way of example, display apparatus 100 may be automatically switched to an "off" mode, if there is no operation of display apparatus 100 for a predetermined time.

Further, display apparatus 100 may be configured to include a memory (not illustrated) that previously stores at least one image, content or information. By way of example, but not limitation, the memory may include high speed random access memory, non-volatile memory such as one or more magnetic disk storage devices, flash memory devices, or other non-volatile solid state memory devices, network attached storage accessed or any suitable combination thereof.

As described above, the display property of information area 130 is controlled based on the activity of the at least one pupil within the eyes. Further, a user of display apparatus 100 may control and customize the display property of information area 130, such as a position or a size, etc.

Figure 2A:
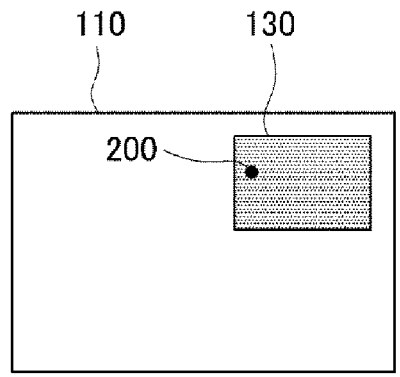
FIGS. 2A to 2C schematically show illustrative examples of an optical element in accordance with at least some embodiments described herein.
Figure 2B:
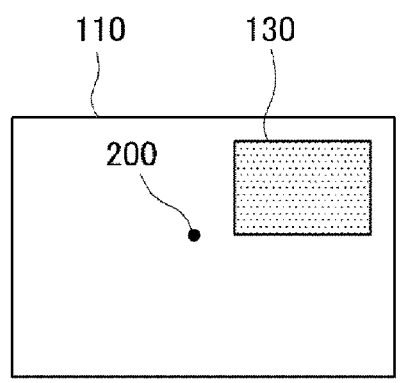
Figure 2C:
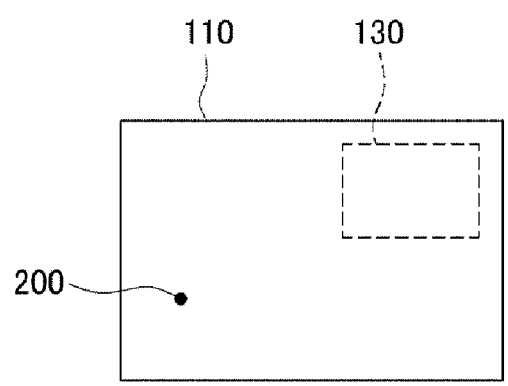

FIGS. 2A to 2C schematically show illustrative examples of an optical element in accordance with at least some embodiments described herein. Processor 140 of display apparatus 100 may be configured to determine a gaze point 200 of at least one pupil. Further, processor 140 may be configured to calculate a distance between gaze point 200 and information area 130. Processor 140 may be further configured to change a display property (e.g., a transparency) of information area 130, as the distance between gaze point 200 and information area 130 is changed. By way of example, but not limitation, as depicted in FIGS. 2A to 2C, as gaze point 200 recedes from information area 130, so the distance between gaze point 200 and information area 130 increases, the transparency of information area 130 may be increased.

Figure 3A:
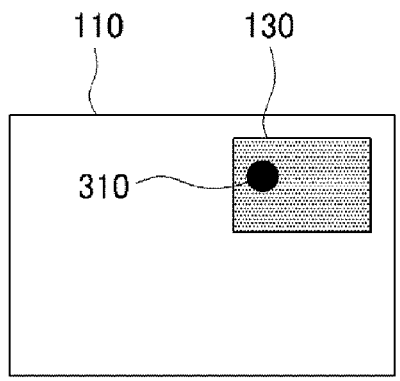
FIGS. 3A to 3C schematically show another illustrative examples of an optical element in accordance with at least some embodiments described herein.
Figure 3B:
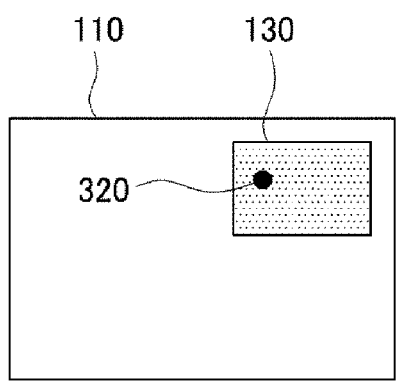
Figure 3C:
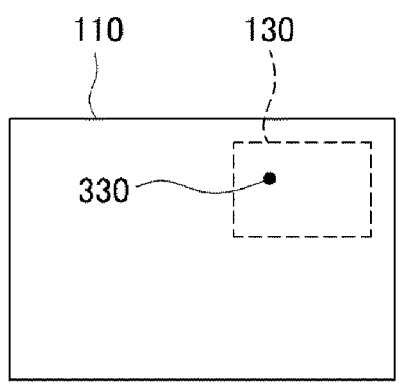

FIGS. 3A to 3C schematically show another illustrative examples of an optical element in accordance with at least some embodiments described herein. Processor 140 of display apparatus 100 may be configured to calculate a focal length of pupils. Further, processor 140 may be configured to determine a display property (e.g., a transparency) of information area 130, as the focal length of the pupil is changed. By way of example, but not limitation, FIG. 3A may indicate that a gaze point 310 is positioned within information area 130 and a focal point of the pupils is focused on information area 130, so the pupils make a first focal length. Further, FIG. 3B may indicate a case where a gaze point 320 is positioned within information area 130, but the focal point of the pupils is focused on a deeper position than information area 130, so the pupils make a second focal length that is longer than the first focal length. Further, FIG. 3C may indicate a case where a gaze point 330 is positioned within information area 130, but the focal point of the pupils is focused on a much deeper position than information area 130, so the pupils make a third focal length that is longer than the second focal length. By way of example, but not limitation, as depicted in FIGS. 3A to 3C, as the focal length of the pupils increases, the transparency of information area 130 may be increased.

Figure 4A:
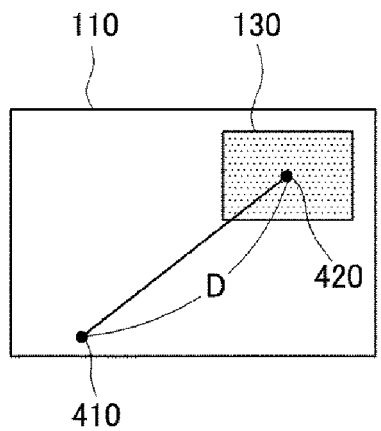
FIG. 4A schematically shows still another illustrative example of an optical element in accordance with at least some embodiments described herein.

FIG. 4A schematically shows still another illustrative example of an optical element in accordance with at least some embodiments described herein. As depicted in FIG. 4A, processor 140 may be configured to determine a gaze point 410 based at least in part on an activity of pupils. Processor 140 may be further configured to calculate a distance D between the determined gaze point 410 and information area 130. By way of example, but not limitation, processor 140 may be configured to calculate distance D between the determined gaze point 410 and a reference point 420 (e.g., center point) in information area 130. Then, processor 140 may be configured to determine a display property of information area 130 based at least in part on the calculated distance D.

Figure 4B:
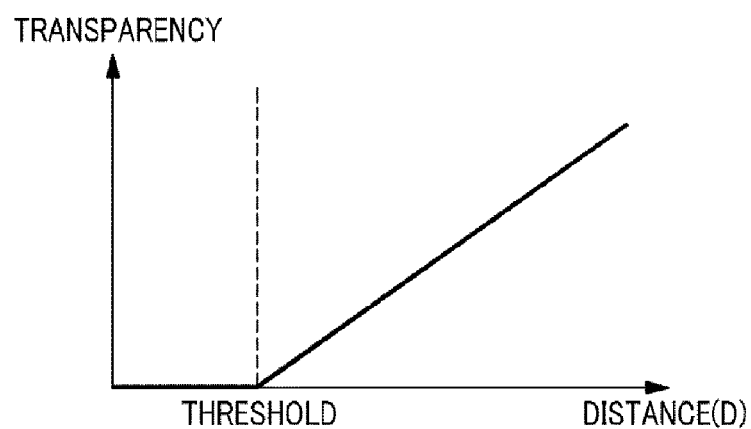
FIGS. 4B to 4C schematically show illustrative examples of a graph showing a transparency change in accordance with at least some embodiments described herein.
Figure 4C:
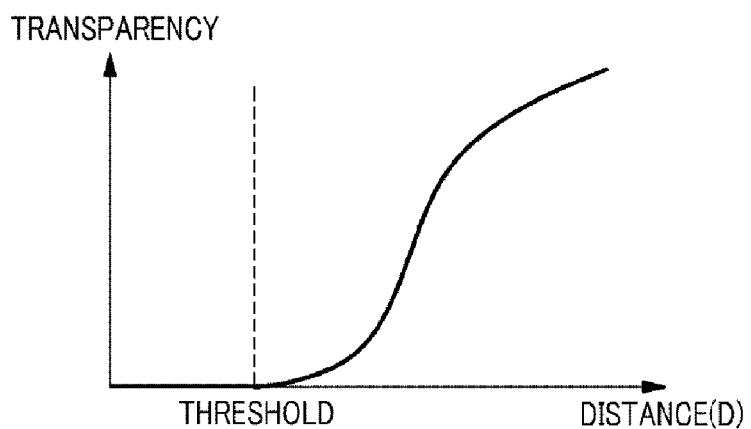

FIGS. 4B to 4C schematically show illustrative examples of a graph showing a transparency change in accordance with at least some embodiments described herein. As depicted in FIGS. 4B to 4C, as distance D increases, the transparency of information area 130 increases. Further, the transparency of information area 130 is changed, when distance D is larger than a predetermined threshold value. Further, in some embodiments, as depicted in FIG. 4B, the transparency of information area 130 is changed in proportion to distance D between the gaze point 410 and reference point 420. In some other embodiments, as depicted in FIG. 4C, the transparency of information area 130 is changed in an S-shaped, as distance D between the gaze point 410 and reference point 420 increases or decreases.

Figure 5A:
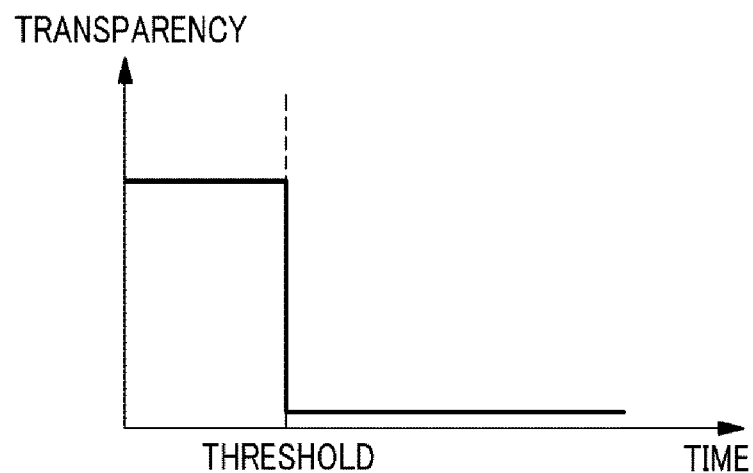
FIGS. 5A to 5B schematically show another illustrative examples of a graph showing a transparency change in accordance with at least some embodiments described herein.
Figure 5B:
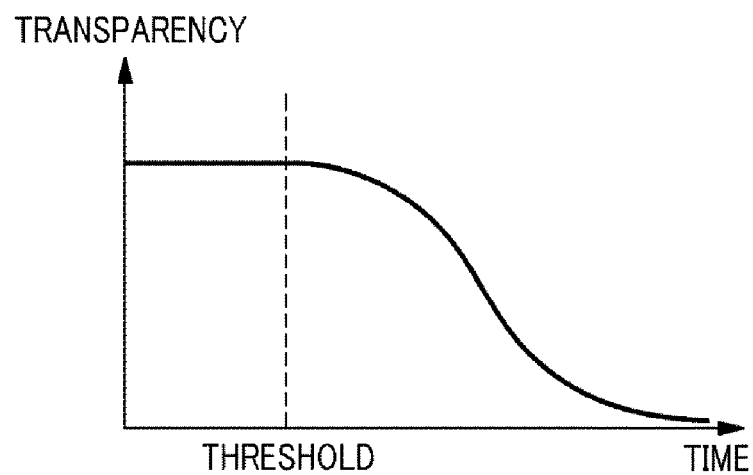

FIGS. 5A to 5B schematically show another illustrative examples of a graph showing a transparency change in accordance with at least some embodiments described herein. Processor 140 may be configured to determine a gaze point and to detect a position of the gaze point. Further, processor 140 may be configured to then change a display property of information area 130 based on the position of the gaze point and a time duration for which the gaze point exists at the position. By way of example, but not limitation, as depicted in FIG. 5A, a transparency of information area 130 is changed, if the gaze point exists at the position for more than a predetermined threshold time duration. Further, by way of another example, as depicted in FIG. 5B, a transparency of information area 130 is changed in an S-shaped curve, if the gaze point exists at the position for more than the predetermined threshold time duration.

Figure 6:
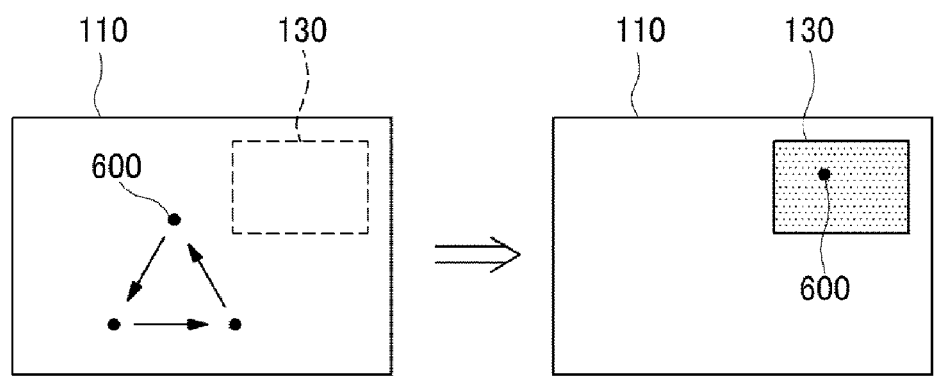
FIG. 6 schematically shows still another illustrative example of an optical element in accordance with at least some embodiments described herein.

FIG. 6 schematically shows still another illustrative example of an optical element in accordance with at least some embodiments described herein. In some embodiments, processor 140 may be configured to determine a gaze point 600. Further, processor 140 may be configured to detect a moving pattern (e.g., a triangle pattern) of gaze point 600, if gaze point 600 moves. Further, processor 140 may be configured to calculate a similarity between the detected moving pattern and a predetermined pattern stored in a memory. Processor 140 may be configured to then determine a display property of information area 130 based at least in part on the calculated similarity. By way of example, but not limitation, as depicted in FIG. 6, processor 140 may be configured to change a transparency of information area 130, so information area 130 becomes clear and vivid, if processor 140 determines that the calculated similarity is larger than a predetermined value.

Figure 7:
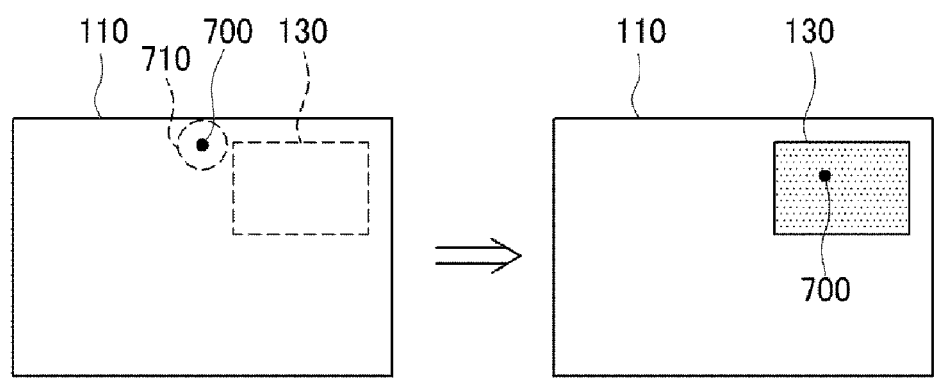
FIG. 7 schematically shows still another illustrative example of an optical element in accordance with at least some embodiments described herein.

FIG. 7 schematically shows still another illustrative example of an optical element in accordance with at least some embodiments described herein. In some embodiments, processor 140 may be configured to determine a gaze point 700. Further, processor 140 may be configured to determine whether gaze point 700 exists inside of a predetermined area 710 on optical element 110 for a predetermined time, which is stored in a memory. Processor 140 may be configured to change a display property of information area 130, if gaze point 700 is determined to exist inside of predetermined area 710 on optical element 110 for the predetermined time. By way of example, but not limitation, as depicted in FIG. 7, processor 140 may be configured to change a transparency of information area 130, so information area 130 becomes clear and vivid, if gaze point 700 is determined to exist inside of predetermined area 710 on optical element 110 for the predetermined time.

Figure 8:
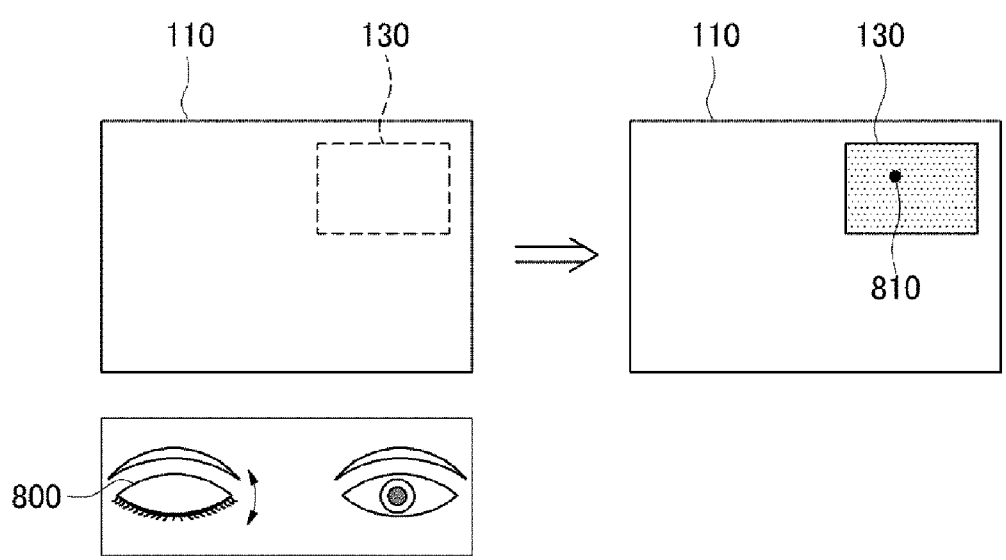
FIG. 8 schematically shows still another illustrative example of an optical element in accordance with at least some embodiments described herein.

FIG. 8 schematically shows still another illustrative example of an optical element in accordance with at least some embodiments described herein. In some embodiments, eye tracker 120 may be configured to detect a blinking of at least one eye 800. Further, processor 140 may be configured to determine a number of the blinking of eye 800 during a predetermined time, which is stored in a memory. Further, processor 140 may be configured to determine whether the determined number of the blinking is equal to or larger than a predetermined value, which is stored in a memory. Processor 140 may be configured to change a display property of information area 130, if the determined number of the blinking is equal to or larger than the predetermined value. By way of example, but not limitation, as depicted in FIG. 8, processor 140 may be configured to change a transparency of information area 130, so information area 130 becomes clear and vivid, if the number of the blinking is determined to be equal to or larger than the predetermined value.

Figure 9:
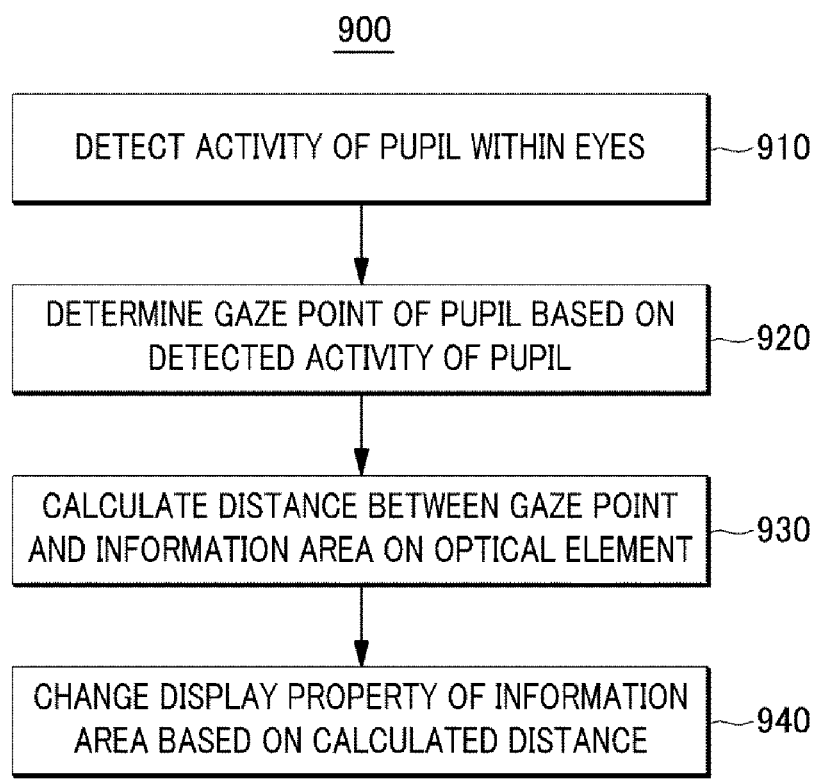
FIG. 9 shows an example processing flow for implementing at least portions of display property determination described herein.

FIG. 9 shows an example processing flow 900 for implementing at least portions of display property determination described herein. The process in FIG. 9 may be implemented by display apparatus 100 including optical element 110, eye tracker 120, information area 130, processor 140 and on/off switch 150, as illustrated in FIG. 1. Non-limiting examples of display apparatus 100 may include a glasses, a head mount display device, a telescope, or various other display device. An example process may include one or more operations, actions, or functions as illustrated by one or more blocks 910, 920, 930 and/or 940. Although illustrated as discrete blocks, various blocks may be divided into additional blocks, combined into fewer blocks, or eliminated, depending on the desired implementation. Processing may begin at block 910.

At block 910 (Detect Activity of Pupil within Eyes), eye tracker 120 may detect an activity of at least one pupil within eyes. By way of example, but not limitation, eye tracker 120 may detect the activity of the at least one pupil by using at least some of a light emitter, a light receiver and an analyzer. By way of another example, eye tracker 120 may detect the activity of the at least one pupil by using an image sensor such as a charge-coupled device (CCD) sensor or a complementary metal-oxide-semiconductor (CMOS) sensor. Processing may proceed from block 910 to block 920.

At block 920 (Determine Gaze Point of Pupil based on Detected Activity of Pupil), processor 140 may determine a gaze point of the pupil based on the activity of the pupil, which is detected at block 910. By way of example, processor 140 may determine the gaze point of the pupil by using any well-known gaze point determining method using binocular disparity information. Processing may proceed from block 920 to block 930.

At block 930 (Calculate Distance between Gaze Point and Information Area on Optical Element), processor 140 may calculate a distance between the gaze point determined at block 920 and information area 130 on optical element 110. By way of example, process 140 may predefine a reference point on information area 130, and process 140 may calculate the distance between the gaze point and the predefined reference point. Processing may proceed from block 930 to block 940.

At block 940 (Change Display Property of Information Area based on Calculated Distance), processor 140 may determine and change a display property of information area 130 based at least in part on the distance calculated at block 930. Non-limiting examples of the display property may include at least one of a transparency, a size, a brightness, a chroma, a display resolution, an on/off switch, or a blinking speed of information area 130. By way of example, processor 140 may increase the transparency of information area 130, as the distance increases, otherwise as the distance decreases, processor 140 may decrease the transparency of information area 130. By way of another example, processor 140 may decrease at least one of the size, the brightness, the blinking speed, the resolution, or the chroma of information area 130, as the distance increases.

Figure 10:
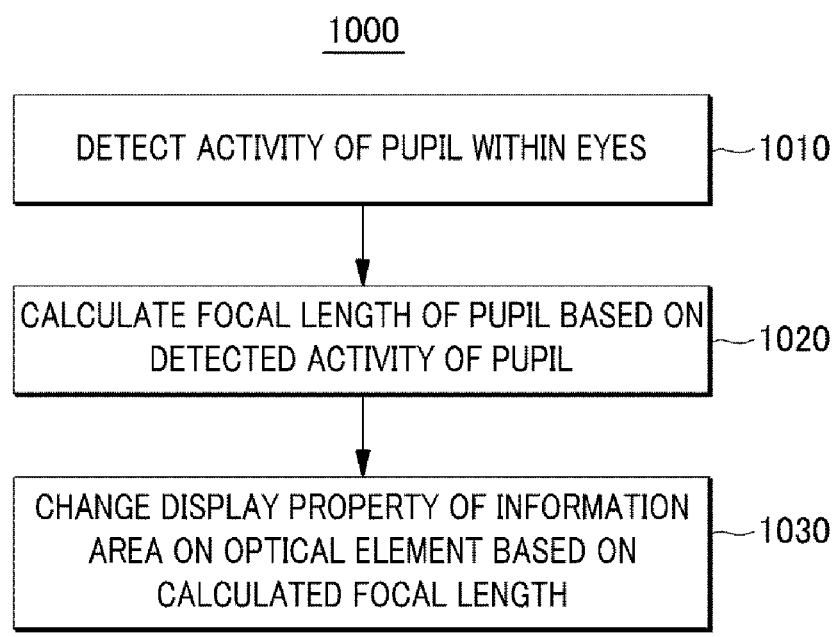
FIG. 10 shows another example processing flow for implementing at least portions of display property determination described herein.

FIG. 10 shows another example processing flow for implementing at least portions of display property determination described herein. The process in FIG. 10 may be implemented by display apparatus 100 including optical element 110, eye tracker 120, information area 130, processor 140 and on/off switch 150, as illustrated in FIG. 1. Non-limiting examples of display apparatus 100 may include a glasses, a head mount display device, a head up display device, a telescope, or other kinds of display devices. An example process may include one or more operations, actions, or functions as illustrated by one or more blocks 1010, 1020 and/or 1030. Although illustrated as discrete blocks, various blocks may be divided into additional blocks, combined into fewer blocks, or eliminated, depending on the desired implementation. Processing may begin at block 1010.

At block 1010 (Detect Activity of Pupil within Eyes), eye tracker 120 may detect an activity of at least one pupil within eyes. By way of example, but not limitation, eye tracker 120 may detect the activity of the at least one pupil by using at least some of a light emitter, a light receiver and an analyzer. By way of another example, eye tracker 120 may detect the activity of the at least one pupil by using an image sensor such as a charge-coupled device (CCD) sensor or a complementary metal-oxide-semiconductor (CMOS) sensor. Processing may proceed from block 1010 to block 1020.

At block 1020 (Calculate Focal Length of Pupil based on Detected Activity of Pupil), processor 140 may calculate a focal length of the at least one pupil based on the activity of the pupil, which is detected at block 1010. By way of example, but not limitation, processor 140 may calculate the focal length of the at least one pupil by using any well-known focal length calculating method using binocular disparity information, a shape of a ciliary body or a state of an eyeball. Processing may proceed from block 1020 to block 1030.

At block 1030 (Change Display Property of Information Area on Optical Element based on Calculated Focal Length), processor 140 may determine and change a display property of information area 130 on optical element 110 based at least in part on the focal length calculated at block 1020. Non-limiting examples of the display property may include at least one of a transparency, a size, a brightness, a chroma, a display resolution, an on/off switch, or a blinking speed of information area 130. By way of example, processor 140 may increase the transparency of information area 130, as the focal length increases, otherwise as the focal length decreases, processor 140 may decrease the transparency of information area 130. By way of another example, processor 140 may increase at least one of the size, the brightness, the blinking speed, the resolution, or the chroma of information area 130, as the focal length decreases.

The examples described above, with regard to FIGS. 1-10, may be implemented in a computing environment having components that include, but are not limited to, one or more processors, system memory, and a system bus that couples various system components. Further, the computing environment may include a variety of computer readable media that are accessible by any of the various components, and includes both volatile and non-volatile media, removable and non-removable media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, but not limitation, computer readable media may comprise computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Communication media typically embodies computer readable instructions, data structures, program modules, or other data in a modulated data signal, such as carrier wave or other transport mechanism. Communication media also includes any information delivery media. The term modulated data signal means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

What is claimed is:

1. A display apparatus, comprising:
an optical element having thereon an information area;
an eye tracker configured to detect an activity of at least one pupil within eyes;
a processor configured to change a display property of the information area based at least in part on the activity of the at least one pupil,
wherein the display property includes at least one of a transparency, a size, a brightness, a chroma, a resolution or a blinking speed of the information area, and
wherein the processor is further configured to:
determine a gaze point of the at least one pupil based at least in part on the detected activity of the at least one pupil,
calculate a distance between the gaze point of the at least one pupil and the information area, and
determine the display property of the information area based at least in part on the calculated distance.

2. The display apparatus of claim 1, wherein the processor is further configured to increase the transparency of the information area, as the distance increases, and
wherein the processor is further configured to decrease the transparency of the information area, as the distance decreases.

3. The display apparatus of claim 1, wherein the processor is further configured to decrease at least one of the size, the brightness, the blinking speed, the resolution, or the chroma of the information area, as the distance increases.

4. The display apparatus of claim 1, wherein the processor is further configured to:
determine that the distance is larger than a predetermined value, and
change the transparency of the information area.

5. The display apparatus of claim 4, wherein the transparency of the information area is changed in an S-shaped curve, as the distance increases or decreases.

6. The display apparatus of claim 1, wherein the processor is further configured to decrease the transparency of the information area at a faster speed than a case where the processor increases the transparency of the information area.

7. A display apparatus, comprising:
an optical element having thereon an information area;
an eye tracker configured to detect an activity of at least one pupil within eyes;
a processor configured to change a display property of the information area based at least in part on the activity of the at least one pupil,
wherein the display property includes at least one of a transparency, a size, a brightness, a chroma a resolution or a blinking speed of the information area, and
wherein the processor is further configured to:
determine whether a gaze point of the at least one pupil moves from an outside of the information area to an inside of the information area based at least in part on the detected activity of the at least one pupil, and
decrease the transparency of the information area, if the gaze point is determined to move from the outside of the information area to the inside of the information area.

8. The display apparatus of claim 1, wherein the processor is further configured to:
change the display property of the information area, if the gaze point moves from an inside of the information area to an outside of the information area and then the gaze point exists outside of the information area for a predetermined time.

9. A display apparatus, comprising:
an optical element having thereon an information area;
an eye tracker configured to detect an activity of at least one pupil within eyes;
a processor configured to change a display property of the information area based at least in part on the activity of the at least one pupil,
wherein the display property includes at least one of a transparency, a size, a brightness, a chroma a resolution or a blinking s seed of the information area, and
wherein the processor is further configured to:
calculate a focal length of the at least one pupil based at least in part on the detected activity of the at least one pupil, and
determine the display property of the information area based at least in part on the calculated focal length.

10. The display apparatus of claim 9, wherein the processor is further configured to increase the transparency of the information area, as the focal length increases.

11. The display apparatus of claim 9, wherein the processor is further configured to:
determine that the focal length is larger than a predetermined value, and
change the transparency of the information area.

12. The display apparatus of claim 9, wherein the processor is further configured to increase at least one of the size, the brightness, the resolution, or the chroma of the information area, as the focal length decreases.

13. The display apparatus of claim 1, wherein the processor is further configured to:
detect a moving pattern of the gaze point
calculate a similarity between the moving pattern and a predetermined pattern stored in a memory, and
determine the display property of the information area based at least in part on the calculated similarity.

14. The display apparatus of claim 1, wherein the processor is further configured to:
change the display property of the information area, if the gaze point exists inside of a predetermined area on the optical element for a predetermined time.

15. The display apparatus of claim 1, wherein the eye tracker is further configured to detect an activity of the eyes, wherein the processor is further configured to:
determine a number of a blink of the eyes during a predetermined time based at least in part on the detected activity of the eyes,
determine that the number of the blink of the eyes is equal to or larger than a predetermined value, and
change the display property of the information area.

16. The display apparatus of claim 1, wherein the eye tracker includes at least one inside camera configured to capture an image of the at least one pupil within the eyes.

17. The display apparatus of claim 1, further comprising:
an on/off switch configured to stop or start at least one operation of the eye tracker and/or the processor.

* * * * *